United States Patent
Boche et al.

(10) Patent No.: US 10,415,731 B2
(45) Date of Patent: Sep. 17, 2019

(54) SIX SIDED FORGED FERRULE STAKING CRIMPED FITTING AND METHOD OF MANUFACTURE THEREOF

(71) Applicant: ContiTech USA, Inc., Fairlawn, OH (US)

(72) Inventors: Craig Boche, Norfolk, NE (US); Jeremy Jay Lidgett, Norfolk, NE (US)

(73) Assignee: ContiTech USA, Inc., Fairlawn, OH (US)

( * ) Notice: Subject to any disclaimer, the term of this patent is extended or adjusted under 35 U.S.C. 154(b) by 256 days.

(21) Appl. No.: 15/482,843

(22) Filed: Apr. 10, 2017

(65) Prior Publication Data
US 2018/0292035 A1 Oct. 11, 2018

(51) Int. Cl.
*F16L 33/207* (2006.01)
*F16L 33/22* (2006.01)
*F16L 19/025* (2006.01)

(52) U.S. Cl.
CPC .......... *F16L 33/22* (2013.01); *F16L 33/2076* (2013.01); *F16L 19/025* (2013.01)

(58) Field of Classification Search
CPC . F16L 33/207; F16L 33/2071; F16L 33/2073; F16L 33/2076
USPC .............................. 285/256, 242; 29/506, 508
See application file for complete search history.

(56) References Cited

U.S. PATENT DOCUMENTS

| | | | | |
|---|---|---|---|---|
| 2,374,225 A * | 4/1945 | Melsom | ............... | F16L 33/2076 285/179 |
| 2,479,499 A * | 8/1949 | Le Clair | ............. | F16L 33/2073 285/256 |
| 4,281,862 A * | 8/1981 | Ridenour | ............... | B21D 39/04 285/382.2 |
| 4,804,212 A * | 2/1989 | Vyse | ...................... | B21D 39/04 285/256 |
| 5,597,186 A * | 1/1997 | Ridenour | ............... | F16L 13/146 285/330 |
| 6,318,763 B1 * | 11/2001 | Huang | ................. | F16L 33/2078 285/256 |
| D577,795 S | 9/2008 | Smith et al. | | |
| 8,282,138 B2 | 10/2012 | Steiner | | |
| 8,943,668 B2 | 2/2015 | Menor | | |
| D737,127 S | 8/2015 | Yeh | | |
| D777,565 S | 1/2017 | Yeh | | |
| 2004/0104572 A1* | 6/2004 | Gilbreath | ............ | F16L 33/2071 285/256 |
| 2004/0145182 A1 | 7/2004 | Smith et al. | | |
| 2004/0251683 A1* | 12/2004 | Fisher | ................. | F16L 33/2076 285/256 |

(Continued)

FOREIGN PATENT DOCUMENTS

WO 1994018487 A1 8/1994

*Primary Examiner* — Aaron M Dunwoody
(74) *Attorney, Agent, or Firm* — David L. Cate

(57) ABSTRACT

Methods of making hose fittings include providing a stem having a fluid conduit, a first end, a second end with a raised shoulder, and a crimp region disposed between the first end and the second end. A swivel tube nut is placed over the stem, and the swivel tube nut is retained on the stem the by the raised shoulder. A ferrule is thereafter placed over the first end of the stem, and the ferrule comprises a partially formed hexagonal wrench surface, formed prior to. The ferrule is then crimped, at the hexagonal wrench surface, onto the crimp region of the stem.

12 Claims, 3 Drawing Sheets

(56) References Cited

U.S. PATENT DOCUMENTS

| | | | |
|---|---|---|---|
| 2008/0185840 A1* | 8/2008 | Menor | F16L 13/141 |
| | | | 285/256 |
| 2010/0123310 A1 | 5/2010 | Miller et al. | |
| 2010/0140926 A1 | 6/2010 | Swift et al. | |
| 2011/0101680 A1* | 5/2011 | Menor | F16L 33/2073 |
| | | | 285/247 |
| 2017/0146172 A1* | 5/2017 | Webster | E21B 17/04 |
| 2018/0031158 A1* | 2/2018 | Gaspar | F16L 33/225 |
| 2018/0345179 A1* | 12/2018 | Kury | A47L 15/42 |
| 2018/0356020 A1* | 12/2018 | Zavorka | F16L 33/2076 |

\* cited by examiner

SIX SIDED FORGED FERRULE STAKING CRIMPED FITTING AND METHOD OF MANUFACTURE THEREOF

FIELD

The present disclosure relates generally to hydraulic hose fittings, and methods making such, and more particularly to forming a hexagon shape on an outer portion of a ferrule of a fitting.

BACKGROUND

This section provides background information to facilitate a better understanding of the various aspects of the disclosure. It should be understood that the statements in this section of this document are to be read in this light, and not as admissions of prior art.

Hose fittings are used to connect a fluid line or hose to various types of industrial equipment and machinery via the equipment connection ports or manifolds. A hose fitting typically has two ends: one end generally defines the hose connection end and the other end generally defines the equipment connection end. In one type of hose fitting, a stem is provided having a first end, the equipment connection end, and a second end, the hose connection end, wherein the second end includes a shell placed over the stem. The first end of the stem may be threaded or may include a nut placed thereon for engaging the equipment. The external surface of the second end of the stem typically engages the internal surface of a hose, while the internal surface of the shell engages the external surface of the hose.

During the manufacture of such hose fittings, a wrenching surface, such as a hexagonal surface, is generally provided on the outer portion of the shell. A wrench, or other suitable tool, may be used to engage the wrenching surface while securing the equipment connection end of the fluid coupling to the equipment. This maintains stability of the hose connection end and prevents damage to the hose and/or its connection to the coupling by a resulting tendency to twist during the securing procedure. The hexagonal surface is generally provided at a different horizontal location of the fluid coupling than the horizontal location of a joined portion of the stem and the shell. Common methods of joining the coupling pieces include crimping, staking, swaging, etc.

Some hydraulic hose fittings require two hexes on the fitting. One hex is on a swivel nut and the second hex is solid and formed the stem. When the fitting is attached to a manifold, one wrench rotates the swivel nut and a second wrench prevents the stem from rotating. The inner diameter of the swivel nut is smaller than the hex size on the stem. There are two common designs for this type of fitting. In the first design, the stationary hex on the stem is created by machining hex bar stock or forging the hex into the stem. The connection end of the fitting is left as an open tube. A tube nut slides over the open end of the tube and a larger outer diameter part is brazed onto the end of the tube to retain the swivel nut. In the second design, the stem is machined out of hex bar stock or forged with a hex on the stem. The shoulder that retains the swivel nut is machined solid onto the stem so no brazing is required. The swivel nut is then crimped over the shoulder on the stem so it is retained by the shoulder.

Brazing two stem sections together requires an additional process step which increases cost and creates a potential leak at the brazed connection. Crimping the swivel nut onto the stem requires an additional process step which increases cost and the crimped nut has lower max torque values compared to tube nut designs. Furthermore, it is difficult to fully form the flats on a six sided hex by crimping a round ferrule.

This invention solves that problem by forging the hex shape into the ferrule when it is first made. Then the crimp dies align with the flats on the ferrule and crimp the final amount to stake the ferrule to the stem.

Thus, there is an ongoing need for improved hose fittings, and methods of manufacturing such, with fewer process steps, and increased torque ratings for such fittings, such needs met at least in part with embodiments according to the following disclosure.

SUMMARY

This section provides a general summary of the disclosure, and is not a necessarily a comprehensive disclosure of its full scope or all of its features.

In some aspects of the disclosure, methods of making hose fittings include providing a stem having a fluid conduit, a first end, a second end with a raised shoulder, and a crimp region disposed between the first end and the second end. In some cases, the crimp region includes knurls and/or raised grooves for mating with a ferrule. Further, the stem may include barbs for sealingly engaging an inner diameter of a hose.

A swivel tube nut is then placed over the stem, and the swivel tube nut is retained on the stem the by the raised shoulder. A ferrule is thereafter placed over the first end of the stem, and the ferrule comprises a partially formed hexagonal wrench surface, formed prior to. The ferrule is then crimped, at the hexagonal wrench surface, onto the crimp region of the stem.

In some cases, the crimping is conducted using a crimp die tool. The crimp die tool may include at least two die pieces engaging the hexagonal wrench surface of the ferrule, or at least four die pieces engaging the hexagonal wrench surface of the ferrule, or even at least six die pieces engaging the hexagonal wrench surface of the ferrule.

In some embodiments, the hose fitting consists of the swivel tube nut, the ferrule and the stem, and the swivel tube nut may be securely connected to the stem, without using a braising process.

The method may further include sealingly securing a hose to the ferrule and the stem, and then sealingly securing a separate apparatus to the swivel tube nut.

In another aspect of the disclosure, a hose fitting includes a stem having a fluid conduit there through, a first end, a second end with a raised shoulder, and a crimp region disposed between the first end and the second end. A swivel tube nut is disposed over the stem, and the swivel tube nut is retained on the stem the by the raised shoulder. A ferrule is disposed over the first end of the stem, and the ferrule has a partially formed hexagonal wrench surface. The ferrule is crimped at the hexagonal wrench surface onto the crimp region of the stem. In some cases, the crimp region has one or more of knurls and raised grooves for mating with the ferrule. The swivel tube nut may be securely connected to the stem in a process which is devoid of braising. Also, the stem may be formed from one solid piece of metallic material. In some cases, the stem includes barbs for sealingly engaging an inner diameter of a hose.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
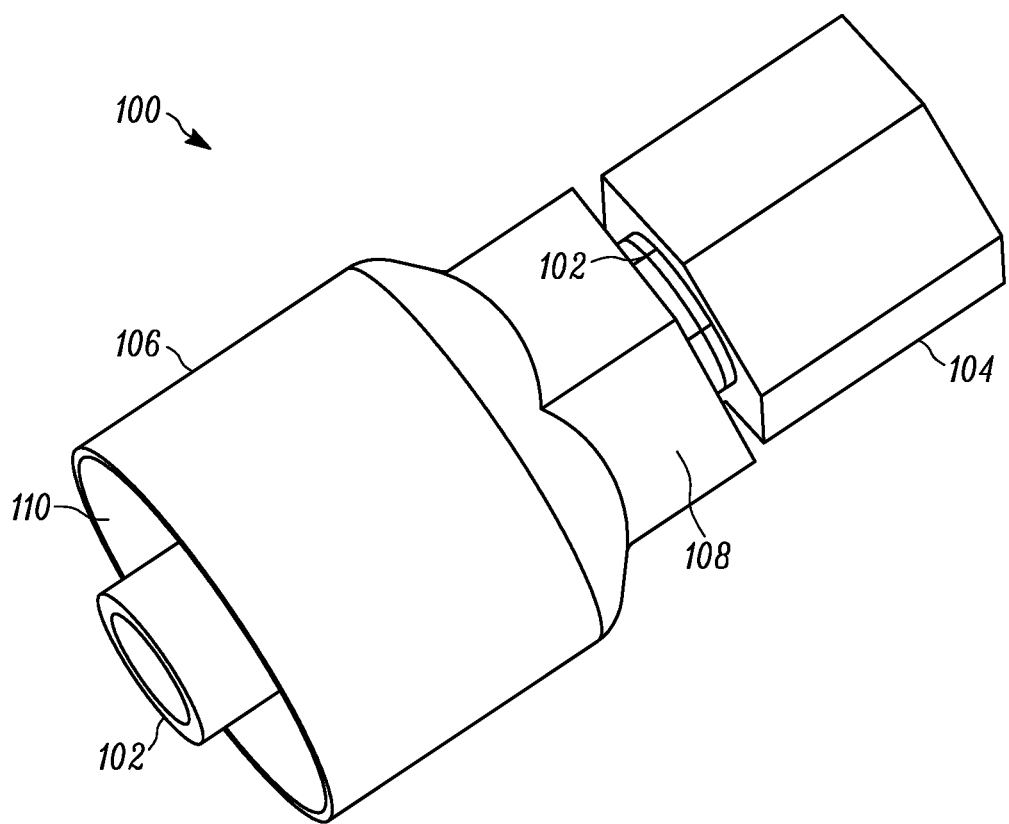
FIG. 1 illustrates an embodiment of a hose fitting in a perspective view, in accordance with the disclosure; and, FIGS. 2A and 2B depict a stem useful in some fitting embodiments, in a partial cross-sectional view (FIG. 2A), and a side cross-sectional view (FIG. 2B), in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

According to some aspects of the disclosure, a hose fitting includes a swivel tube nut which is incorporated onto the stem of the fitting without additional brazing or crimping operations. Also, the stem is one solid piece of metallic material, which better avoids potential leaks, which can occur at a brazed or crimped connection. Using a swivel tube nut in place of a crimp-on nut, also increases the maximum rated torque value of the swivel tube nut.

Furthermore, a hexagonal wrench surface is forged into the ferrule portion of the fitting, and thereafter, the ferrule is pre-crimped onto the stem of the fitting. This is achieved by forging the hexagonal wrench surface shape into the ferrule when it is first made, and thereafter, aligning crimp dies with the six wrench surface flats on the ferrule to crimp the final amount thus fully staking the ferrule to the stem. Forging the hexagonal wrench surface into the ferrule in a first process, substantially forms the hexagonal shape and requires only a small amount of crimping is required to attach ferrule to the stem. In some cases, knurling or grooving the stem in the latch area where the ferrule engages the stem, may further improve the connection of the ferrule and the stem, which in turn, may prevent the ferrule from rotating around the stem when torque is applied to the flats on the ferrule.

Some aspects of the disclosure also involve the use of smaller, than typical, swivel tube nuts, as well as stems which may be machined from smaller round bar stock to reduce the amount of steel removed during machining.

Now referencing FIG. 1, which illustrates an embodiment of a hose fitting in a perspective view, in accordance with the disclosure. Fitting 100 includes at least three basic components, which are stem 102, swivel tube nut 104, and ferrule 106. Swivel tube nut 104 may move freely around the outside of stem 102 thus allowing a threaded inner surface of swivel tube nut 104 to engage a threaded surface of a manifold (not shown), or other apparatus, and be sealingly secured thereto. Stem 102 includes features which enable the swivel tube nut 104 to be retained on the stem 102, as well as forming a sealing connection, as described in greater detail below.

Ferrule 106 includes hexagonal wrench surface 108 which is forged into ferrule 106 prior to being mated with stem 102. After mounting swivel tube nut 104 onto stem 102, an end of stem 102 is disposed through ferrule 106, and extends through opening 110 of ferrule 106. Thereafter, hexagonal wrench surface 108 is crimped on a surface of stem 102 to sealing secure stem 102 with ferrule 106. Stem 102 may include features on the outer surface, in the connection region, to further enable a high torque resistant sealed connection with ferrule 106, as described in greater detail below. Opening 110 of ferrule 106 is used to accept a hose end (not shown), which is sealingly connected over stem 102 and within ferrule 106.

Figure 2A:
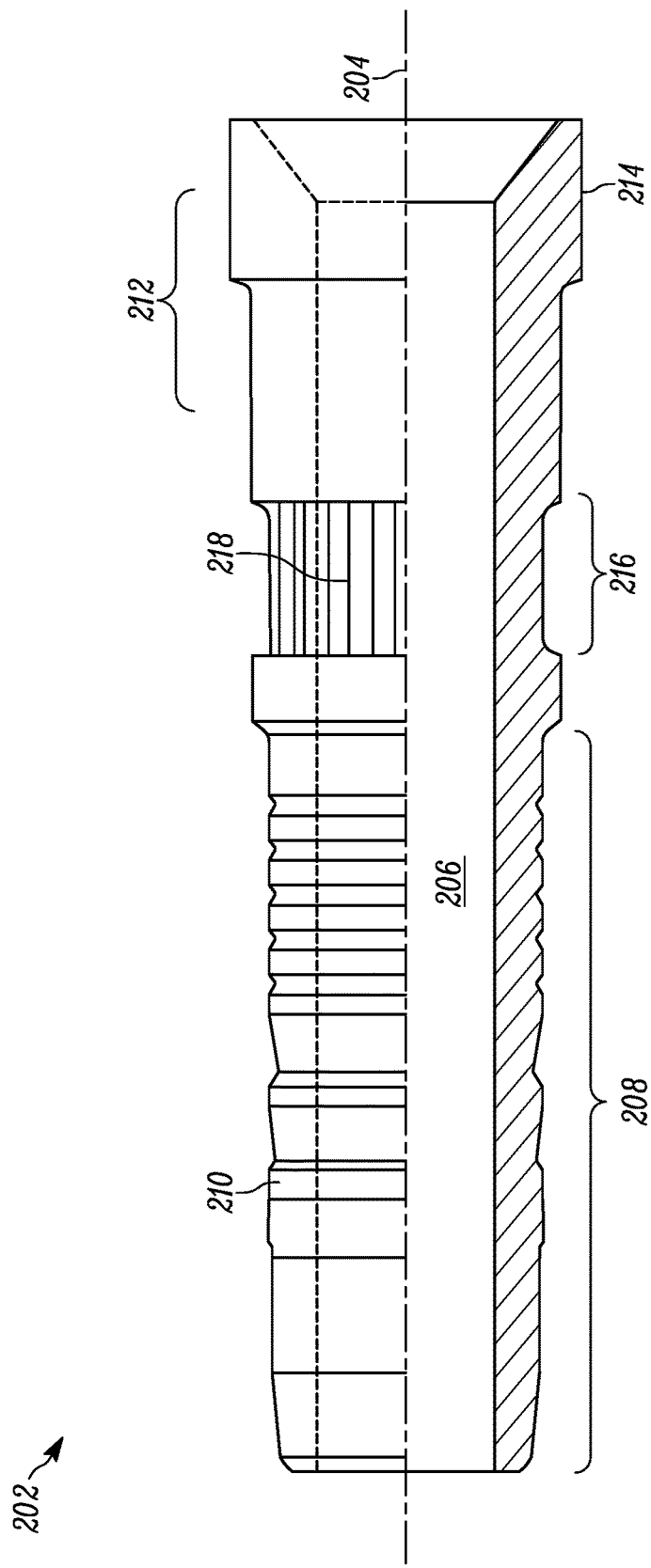
Figure 2B:
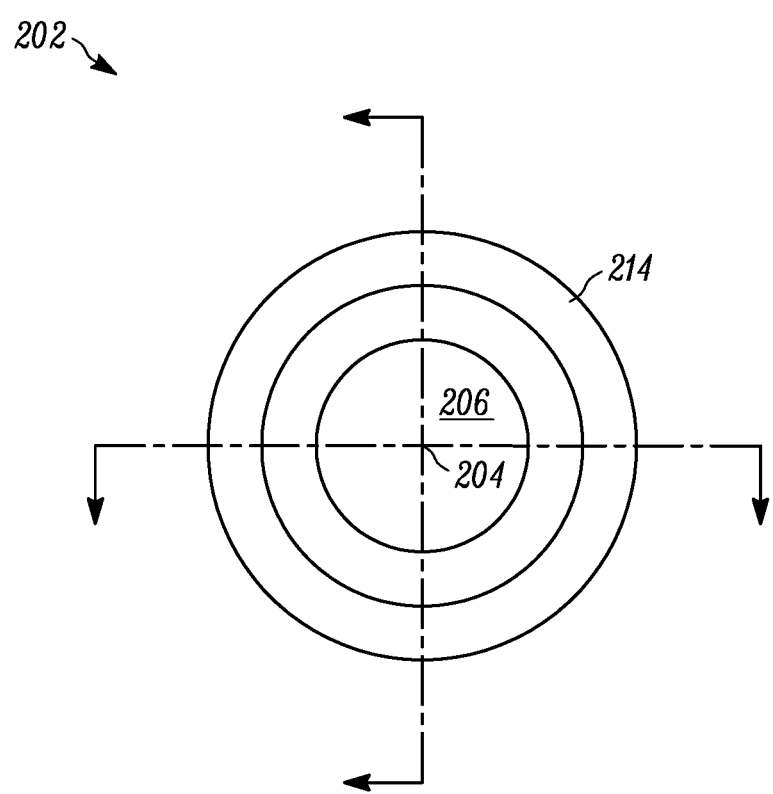

FIGS. 2A and 2B depict one embodiment of a stem, functioning as stem 102 in FIG. 1, which useful in some fitting embodiments, in a partial cross-sectional view FIG. 2A, and a side cross-sectional view FIG. 2B. Stem 202 defines a center axis 204 and fluid conduit 206 there through, for transfer of fluid under pressure. First end 208 of stem 202 sealingly engages an inner diameter of a hose (not shown), and may include features such as barbs 210 (three shown) for retaining the hose there. Stem 202 also includes second end 212 with raised shoulder 214 for receiving and retaining a swivel tube nut, such as swivel tube nut 104 described above. Stem 202 further includes crimp region 216 disposed between first end 208 and second end 212 for sealing mating stem 202 with a hexagonal wrench end of a ferrule (such as ferrule 106 described above), upon crimping the ferrule onto stem 202. In some aspects, crimp region 216 includes knurls and/or raised grooves 218 for further securing the connection between stem 202 and the ferrule.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of making a hose fitting, comprising:
providing a stem defining a center axis and comprising a fluid conduit there through, a first end, a second end with a raised shoulder, and a crimp region disposed between the first end and the second end;
providing and placing a swivel tube nut over the stem, wherein the swivel tube nut is retained on the stem the by the raised shoulder;
placing a ferrule over the first end of the stem, wherein the ferrule comprises a partially formed hexagonal wrench surface formed in a first process; and,
crimping the ferrule at the hexagonal wrench surface onto the crimp region of the stem;
wherein the ferrule comprises a fully formed hexagonal wrench surface upon crimping the ferrule at the hexagonal wrench surface onto the crimp region of the stem.

2. The method according to claim 1, wherein the crimping is conducted using a crimp die tool.

3. The method according to claim 1, wherein the crimp die tool includes at least two die pieces engaging the hexagonal wrench surface of the ferrule.

4. The method according to claim 3, wherein the crimp die tool includes at least four die pieces engaging the hexagonal wrench surface of the ferrule.

5. The method according to claim 4, wherein the crimp die tool includes at least six die pieces engaging the hexagonal wrench surface of the ferrule.

6. The method according to claim 1, wherein the crimp region comprises one or more of knurls and raised grooves for mating with the ferrule, and wherein each of the one or more of knurls and raised grooves is orientated parallel to the center axis of the stem.

7. The method according to claim 1, wherein the hose fitting consists of the swivel tube nut, the ferrule and the stem, and wherein each of the swivel tube nut, the ferrule and the stem is formed from one solid piece of metallic material.

8. The method according to claim 1, wherein the swivel tube nut is securely connected to the stem in a process which is devoid of braising.

9. The method according to claim 1, wherein the stem is formed from one solid piece of metallic material.

10. The method according to claim 1, wherein the stem comprises barbs for sealingly engaging an inner diameter of a hose.

11. The method according to claim 1 further comprising sealingly securing a hose to the ferrule and the stem.

12. The method according to claim 11 further comprising sealingly securing a separate apparatus to the swivel tube nut.

* * * * *